United States Patent
Nguyen et al.

(10) Patent No.: US 8,579,028 B2
(45) Date of Patent: Nov. 12, 2013

(54) TACKIFYING AGENT PRE-COATED PARTICULATES

(75) Inventors: Philip D. Nguyen, Duncan, OK (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 285 days.

(21) Appl. No.: 12/455,903

(22) Filed: Jun. 9, 2009

(65) Prior Publication Data
US 2010/0307749 A1 Dec. 9, 2010

(51) Int. Cl.
*E21B 43/04* (2006.01)

(52) U.S. Cl.
USPC ......... 166/278; 166/276; 166/280.1; 507/904

(58) Field of Classification Search
USPC .............................. 166/280.1, 280.2
See application file for complete search history.

(56) References Cited

U.S. PATENT DOCUMENTS

| | | | |
|---|---|---|---|
| 5,775,425 A | 7/1998 | Weaver et al. | 166/276 |
| 5,787,986 A | 8/1998 | Weaver et al. | 166/280.2 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,960,878 A | 10/1999 | Nguyen et al. | 166/276 |
| 6,047,772 A | 4/2000 | Weaver et al. | 166/276 |
| 6,209,643 B1 | 4/2001 | Nguyen et al. | 166/276 |
| 7,063,151 B2 | 6/2006 | Nguyen et al. | 166/280.2 |
| 7,216,711 B2 | 5/2007 | Nguyen et al. | 166/308.1 |
| 7,258,170 B2 | 8/2007 | Nguyen et al. | 166/305.1 |
| 7,261,156 B2 * | 8/2007 | Nguyen et al. | 166/276 |
| 7,264,051 B2 | 9/2007 | Nguyen et al. | 166/276 |
| 7,308,939 B2 * | 12/2007 | Welton et al. | 166/280.2 |
| 7,350,571 B2 | 4/2008 | Nguyen et al. | 166/276 |
| 7,350,579 B2 | 4/2008 | Gatlin et al. | 166/308.3 |
| 7,392,847 B2 | 7/2008 | Gatlin et al. | 166/308.1 |
| 7,407,010 B2 | 8/2008 | Rickman et al. | 166/295 |
| 2005/0194135 A1 * | 9/2005 | Nguyen et al. | 166/272.1 |
| 2005/0194141 A1 * | 9/2005 | Sinclair et al. | 166/280.2 |

(Continued)

FOREIGN PATENT DOCUMENTS

| | | |
|---|---|---|
| WO | WO 2005/085595 A1 | 9/2005 |
| WO | WO 2006/092586 A1 | 9/2006 |
| WO | WO 2006/123143 A1 | 11/2006 |
| WO | WO 2007/104911 A1 | 9/2007 |

OTHER PUBLICATIONS

International Search Report and Written Opinion for PCT/GB2010/001115 dated Sep. 9, 2010.
SandWedge® Material Safety Data Sheet, Jun. 2, 2007.

*Primary Examiner* — Shane Bomar
*Assistant Examiner* — Silvana Runyan
(74) *Attorney, Agent, or Firm* — Robert A. Kent; McDermott Will & Emery LLP

(57) ABSTRACT

The present invention involves methods of using particulates coated with a tackifying agent that need not be used immediately once they are prepared and that provide increased viscosity when placed into an aqueous fluid. The described methods include the steps of contacting particulates with a tackifying agent to create tackified particulates; contacting the tackified particulates with a partitioning agent to form coated particulates that are capable of being stored for a time period, wherein the partitioning agent comprises a hydratable polymeric material; and, placing the coated particulates in an aqueous treatment fluid whereby the partitioning agent hydrates and increases the viscosity of the treatment fluid.

19 Claims, 1 Drawing Sheet

(56) References Cited

U.S. PATENT DOCUMENTS

| | | | |
|---|---|---|---|
| 2006/0204756 A1 | 9/2006 | Welton et al. | 428/407 |
| 2006/0260810 A1 | 11/2006 | Weaver et al. | |
| 2008/0257553 A1 | 10/2008 | Gatlin et al. | 166/280.2 |
| 2009/0023614 A1* | 1/2009 | Sullivan et al. | 507/214 |
| 2009/0023615 A1* | 1/2009 | Chen et al. | 507/219 |

* cited by examiner

TACKIFYING AGENT PRE-COATED PARTICULATES

BACKGROUND

The present invention involves methods of using particulates coated with a tackifying agent that need not be used immediately once they are prepared and that provide increased viscosity when placed into an aqueous fluid.

Subterranean operations may often use particulates coated with tackifying agents. One example of a production stimulation operation using coated particulates is hydraulic fracturing, wherein a formation may be treated to increase its permeability by hydraulically fracturing the formation to create or enhance one or more cracks or "fractures." In most cases, hydraulic fracturing involves pumping a particulate-free, viscous fluid (known as a pad fluid) into a subterranean formation faster than the fluid can escape into the formation so that the pressure applied to the formation increases, and the formation breaks, creating an artificial fracture or enlarging a natural fracture. Then a proppant particulate may be added to a fluid to form a slurry that is pumped into the fracture to prevent the fracture form closing when the pumping pressure is released. Often, the proppant particulate may be coated with a tackifying agent to enhance agglomeration and to prevent migration of the proppant particulates after they are placed in the fracture.

An example of a well completion operation using coated particulates may be gravel packing. Gravel packing treatments may be used, among other things, to reduce the migration of unconsolidated formation particulates into a well bore. In gravel packing operations, particles known in the art as gravel may be carried to a well bore by a hydrocarbon or aqueous carrier fluid. That is, the particulates may be suspended in a carrier fluid, which may be viscosified, and the carrier fluid may be pumped into a well bore in which the gravel pack is to be placed. The carrier fluid may leak off into the subterranean zone and/or return to the surface while the particulates are left in the zone. The resultant gravel pack may act as a filter to separate formation sands from produced fluids while permitting the produced fluids to flow into the well bore. A portion of the gravel may be coated with tackifying agent, among other things, to further help control the migration of formation fines. Typically, gravel pack operations involve placing a gravel pack screen in the well bore and packing the surrounding annulus between the screen and the well bore with gravel designed to prevent the passage of formation sands through the pack. Such gravel packs may be used to stabilize the formation while causing minimal impairment to well productivity.

A portion of the particulates used in any type of subterranean treatment may be coated with a tackifying agent, among other things, to control fines migration. It may be useful to precoat the particulates with a tackifying agent prior to reaching the well site to prevent premature consolidation of the particles.

SUMMARY

The present invention involves methods of using particulates coated with a tackifying agent that need not be used immediately once they are prepared and that provide increased viscosity when placed into an aqueous fluid.

Some embodiments provide methods of using particulates comprising contacting particulates with a tackifying agent to create tackified particulates; contacting the tackified particulates with a partitioning agent to form coated particulates that are capable of being stored for a time period, wherein the partitioning agent comprises a hydratable polymeric material; and, placing the coated particulates in an aqueous treatment fluid whereby the partitioning agent hydrates and increases the viscosity of the treatment fluid.

Other embodiments provide methods of treating a subterranean formation comprising providing coated particulates that are capable of being stored for a time period, wherein the coated particulates comprise particulates coated with a tackifying agent to form tackified particulates and further coated with a partitioning agent, wherein the partitioning agent comprises a hydratable polymeric material; slurrying the coated particulates in an aqueous treatment fluid to create a particulate slurry and to hydrate the partitioning agent, whereby the hydrated partitioning agent increases the viscosity of the aqueous treatment fluid; and, introducing the coated particulate slurry to a well bore disposed in a subterranean formation.

Still other embodiments provide methods of gravel packing comprising providing coated particulates that are capable of being stored for a time period, wherein the coated particulates comprise particulates coated with a tackifying agent to form tackified particulates and further coated with a partitioning agent, wherein the partitioning agent comprises a hydratable polymeric material; slurrying the coated particulates in an aqueous treatment fluid to create a coated particulate slurry and to hydrate the partitioning agent, whereby the hydrated partitioning agent increases the viscosity of the aqueous treatment fluid; and, introducing the coated particulate slurry to a well bore disposed in a subterranean formation, wherein the coated particulates form a gravel pack substantially adjacent to the well bore.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
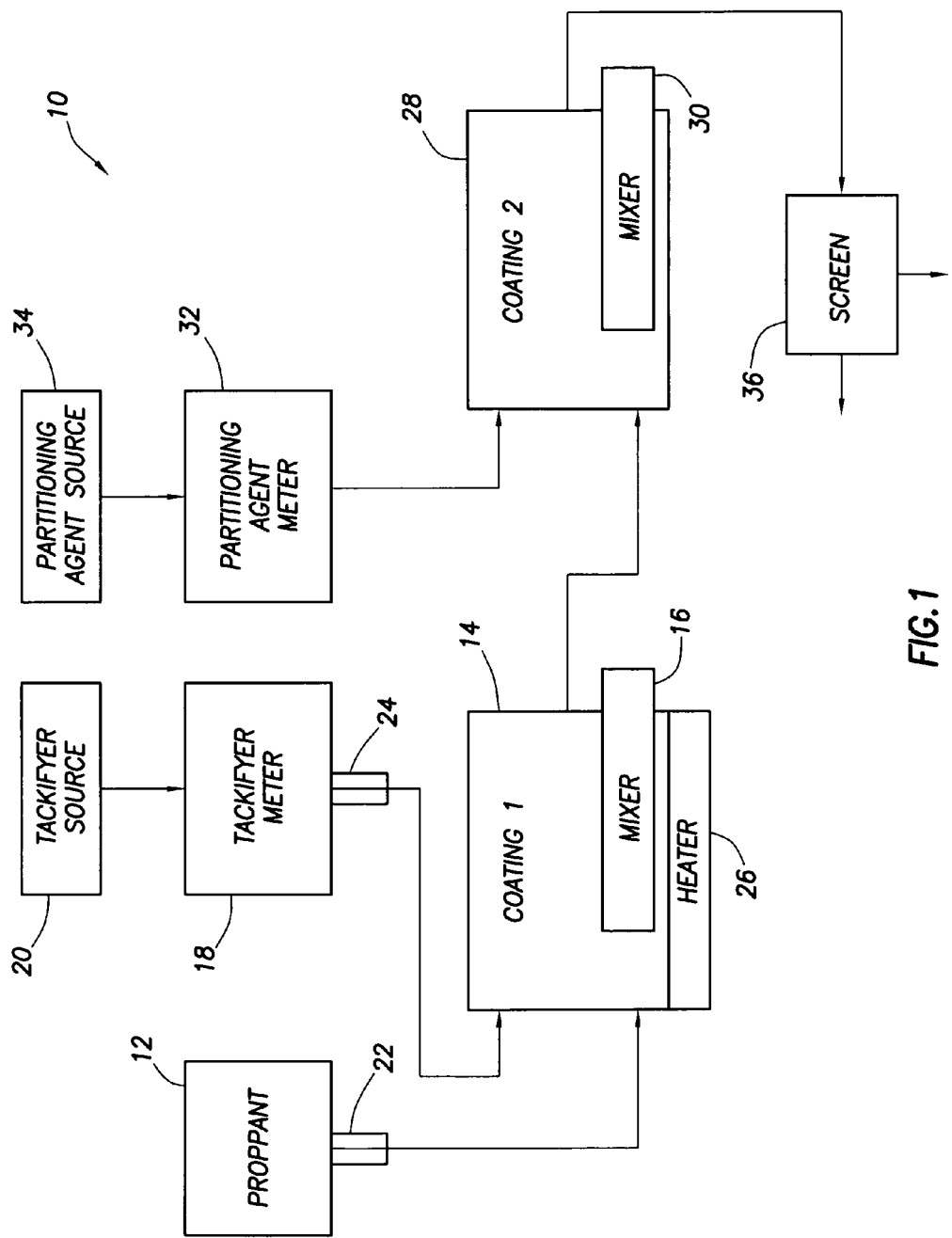
FIG. 1 illustrates a schematic representation of an embodiment of a system useful for preparing partitioned pre-coated particulates according to a method of the present invention.

The present invention involves methods of using particulates coated with a tackifying agent that need not be used immediately once they are prepared and that provide increased viscosity when placed into an aqueous fluid.

While numerous advantages of the present invention exist, only some will be discussed herein. Off-site preparation of coated particulates may help to prevent environmentally harmful chemical spills, improve safety at the well site, simplify treatment procedures by using coated particulates like uncoated particulates, require fewer chemicals, less equipment, and less personnel, thus reducing the footprint of the well site. Particulates coated with tackifying agents, or "tackified particulates," may have a tendency to agglomerate and form masses of joined particulates rather than retaining their individual character. In an embodiment, a method of providing tackified particulates coated with partitioning agents, or "coated particulates" is provided. The disclosed methods of providing coated particulates may allow tackified particulates to temporarily have a diminished "tackiness," thus preventing or minimizing the agglomeration of the particulates and the spreading of tackifying agent onto equipment surfaces. In turn, the coated particulates may be more easily transported and stored with the aid of partitioning agents, thereby reducing operational expenses. In an embodiment, the partitioning agent may be one or more organic partitioning agents. Use of an organic material as a partitioning agent to coat the tackified particulates may be advantageous in reducing environmental concerns, such as spills, contamination, or exposure at the work site.

The term "coating" as used herein refers to at least a partial coating of some or all of the particulates. One hundred percent coverage of the particulates or mix of particulates is not implied by the term "coating."

The term "on-the-fly" is used herein to mean that one flowing stream is introduced into another flowing stream so that the streams are combined and mixed while continuing to flow as a single stream as part of the on-going treatment at the job site. Such mixing can also be described as "real-time" mixing.

As used herein, the term "organic" may refer to a material that is derived from a plant and that is not substantially modified by a subsequent chemical reaction (e.g., polymerized, functionalized, etc.). As used herein, dehydration of an organic material is not considered a chemical reaction or chemical modification. An organic material may be crushed, powderized, or otherwise physically modified so as to be capable of coating a tackified particulate. For example, a plant seed may be dried and ground to form a flour for use as a partitioning agent. In this example, the plant seed undergoes a physical modification without undergoing a substantial modification in a subsequent chemical reaction.

Some embodiments of the present invention describe methods of creating coated particulates that may be created and then stored and shipped before use without excessive agglomeration. In the methods of the present invention, particulates may be coated with a tackifying agent and then be coated with a partitioning agent to help the particulates retain their individual tacky character. In some embodiments of the present invention, the coated particulates may be created hours, weeks, months, or years before they are used. For example, in some embodiments, the coated particulates may be created about 3 to 9 months prior to use.

I. Suitable Particulates.

Particulates suitable for use in the present invention may comprise any material suitable for use in subterranean operations. Suitable materials for these particulates may include, but are not limited to, sand, gravel, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, degradable proppant, and combinations thereof. The mean particulate size generally may range from about 2 mesh to about 400 mesh on the U.S. Sieve Series; however, in certain circumstances, other mean particulate sizes may be desired and may be suitable for practice of the present invention. In some embodiments of the present invention, the particulate may be graded sand having a particle size in the range of from about 10 to about 70 mesh, U.S. Sieve Series. It is within the ability of one skilled in the art, with the benefit of this disclosure, to select a suitable particulate composition and size. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. As will be further discussed in detail, in certain embodiments, the particulates included in the treatment fluids of the present invention may be coated with a tackifying agent. In certain embodiments, the particulates may be present in a fluid in an amount in the range of from about 0.01 pounds per gallon ("ppg") to about 30 ppg by volume of a treatment fluid. In other embodiments, the particulates may be present in a fluid in an amount ranging from about 0.5 ppg to about 8.0 ppg.

II. Suitable Tackifying Agents.

In some embodiments, compositions suitable for use as tackifying agents in the present invention may comprise any compound that, when in liquid form or in a solvent solution, will form a tacky, non-hardening coating upon a particulate. Tackifying agents suitable for use in the present invention include non-aqueous tackifying agents; aqueous tackifying agents; silyl-modified polyamides, and reaction products of an amine and a phosphate ester. In addition to encouraging particulates to form aggregates, the use of a tackifying agent may reduce particulate flow back once the particulates are placed into a subterranean formation. The tackifying agents are preferably coated on the particulates in an amount ranging from about 0.1% to about 5% by weight of the uncoated particulates, preferably ranging from about 0.5% to about 2.5% by weight of the uncoated particulates.

A. Non-Aqueous Tackifying Agents.

One type of tackifying agent suitable for use in the present invention is a non-aqueous tackifying agent. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ d ibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference. Other suitable tackifying agents are described in U.S. Pat. No. 5,853,048 issued to Weaver, et al., the relevant disclosure of which is herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

B. Aqueous Tackifying Agents.

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in Published U.S. Patent Application Number 2005-0277554 and Published U.S. Patent Application Number 2005-0274517, the relevant disclosures of which are hereby incorporated by reference.

Some suitable aqueous tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl(meth)acrylates and their quaternary addition and acid salts, acrylamide, N-(dialkyl amino alkyl)acrylamide, methacrylamides and their quaternary addition and acid salts, hydroxy alkyl(meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

C. Silyl-Modified Polyamide Tackifying Agents.

Silyl-modified polyamide compounds suitable for use as a tackifying agent in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

D. Amine/Phosphate Ester Tackifying Agents.

Yet another tackifying agent suitable for use in the present invention is a reaction product of an amine and a phosphate ester such as those described in U.S. Pat. No. 7,392,847 issued to Gatlin et al., the relevant disclosure of which is herein incorporated by reference. The ratio of amine to phosphate ester combined to create the reaction product tackifying agent is preferably from about 1:1 to about 5:1, more preferably from about 2:1 to about 3:1. In some embodiments it may be desirable to combine the amine an phosphate ester in the presence of a solvent, such as methanol.

To create these amine/phosphate ester tackifying agents, suitable amines include, without limitation, any amine that is capable of reacting with a suitable phosphate ester to form a composition that forms a deformable coating on a metal-oxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

For the phosphate ester component of the amine/phosphate ester tackifying agents, suitable phosphate esters include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$ where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbonyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate.

III. Suitable Partitioning Agents.

Partitioning agents suitable for use in the present invention may be substances that are capable of coating onto tackified particulates and of reducing the tacky character thereof. Partitioning agents suitable for use in the present invention may dissipate or otherwise release from the tackified particulates once the particulates are contacted with a treatment fluid. The terms "dissipate" and "otherwise release" as used herein refers to at least a partial release of the partitioning agent from at least some of the tackified particulates. One hundred percent release of the partitioning agent from the tackified particulates or mix of tackified particulates is not implied by the terms "dissipate" or "otherwise release." Moreover, partitioning agents suitable for use in the present invention may not interfere with the tackifying agent on the particulates when the particulates are used downhole, and may not interfere with the treatment fluid or other compounds or equipment used in the subterranean operation. Suitable partitioning agents may be used alone or in combination. In some embodiments, the partitioning agent may be present on the coated particulates in an amount of from about 0.1% to about 10% by weight of the tackified particulates. In other embodiments, the partitioning agent may be present on the tackified particulates in an amount of from about 0.5% to about 3.0% by weight of the tackified particulates. In some embodiments, substantially the entire surface of the tackified particulates may be covered with a partitioning agent.

In an embodiment, the partitioning agent may be a hydratable polymeric material. As used herein, the term "hydratable polymeric material" may refer to any type of polymer that may be formed into a powder when dehydrated and is at least partially soluble in an aqueous fluid or a fluid that is miscible with an aqueous solution (e.g., an alcohol, a glycol, etc.). As a result of being at least partially soluble in an aqueous fluid or a fluid that is miscible with an aqueous fluid, the hydratable polymeric material may dissipate to some degree when the coated particulates are placed into a fluid. In some embodiments, the gelling agents may be polymers comprising polysaccharides, and derivatives thereof that may contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. The hydratable polymeric material may impart an increased viscosity to a treatment fluid to which the coated particulates are added.

In an embodiment, the hydratable polymeric material may comprise a polysaccharide derivative that may be an organic hydratable polymeric material. Examples of a suitable organic hydratable polymeric materials that may dissolve or otherwise dissipate in a treatment fluid may include, but are not limited to, a starch powder obtained from corn, wheat, potatoes, barley, beans, cassava, or any other plant starch. Alternative organic hydratable polymeric materials may include, but are not limited to grain powders such as those obtained from rice, corn, wheat, beans, or guar gums. In an embodiment, the organic partitioning agents of the present invention may comprise a powder with a particle size of less than about 30 microns. In another embodiment, the organic hydratable polymeric materials may have a size of less than about 10 microns.

In an embodiment, the hydratable polymeric material may comprise an option cross-linking agent to further increase the viscosity of a treatment fluid to which the coated particulates may be added. In these embodiments, the cross-linking agent may be added in as a dry powder to further act as a partitioning agent until the coated particulates are combined with a treatment fluid. Conventional cross-linking agents may comprise a borate ion, a metal ion, or the like, and interact with at least two gelling agent molecules to form a crosslink between them, thereby forming a "cross-linked gelling agent." Examples of cross-linking agents include, but are not limited to, borate releasing compounds and compounds capable of releasing metal cations having a valence state of two or greater. Some metal cations are capable of having more than one valence state. Examples of suitable metal cations include, but are not limited to, magnesium, aluminum, titanium, zirconium, chromium, and antimony, and any mixture thereof in any proportion. Examples of cross-linking agents include a borate releasing compound such as sodium tetraborate and transition metal ion releasing compounds such as titanium dioxide, zirconium oxychloride, and chelates of aluminum, zirconium, or titanium. A treatment fluid to which the coated particulates have been added comprising cross-linked gelling agents may exhibit elastic and/or viscoelastic properties, wherein the cross-links between gelling agent molecules may be broken and reformed, allowing the viscosity of the fluid to vary with certain conditions such as temperature, pH, and the like.

IV. Suitable Treatment Fluids.

During subterranean operations, the coated particulates of the present invention may be suspended in any treatment fluid known in the art, including aqueous gels, foams, emulsions, and viscosified surfactant fluids. Suitable aqueous gels may be generally comprised of an aqueous fluid and one or more gelling agents. An aqueous gel may be formed by the combination of an aqueous fluid and coated particulates where the partitioning agent comprises a gelling agent. Emulsions may be comprised of two or more immiscible liquids such as an aqueous gelled liquid and a liquefied, normally gaseous fluid, such as nitrogen. Treatment fluids suitable for use in accordance with this invention may be aqueous gels comprised of an aqueous fluid, a gelling agent for gelling the aqueous fluid and increasing its viscosity, and optionally, a cross-linking agent for cross-linking the gel and further increasing the viscosity of the fluid. The cross-linking agent may be provided as a component of the partitioning agent on the coated particulates and may be introduced into the aqueous gel by the combination of the coated particulates with an aqueous fluid. The increased viscosity of the gelled or gelled and cross-linked treatment fluid, among other things, may reduce fluid loss and may allow the fracturing fluid to transport significant quantities of suspended particulates. The treatment fluids also may include one or more of a variety of well-known additives such as breakers, stabilizers, fluid loss control additives, clay stabilizers, bactericides, and the like.

V. Suitable Methods of Coating Particulates.

In an embodiment, the methods of the present invention may be carried out using any system capable of providing a coating on particulates to form tackified particulates and then coating the tackified particulates with a partitioning agent. As shown in FIG. 1, such a system may have a number of vessels and mixing devices for coating the particulates and providing the partitioning agent. In an embodiment, a coating system 10 may comprise a first coating chamber 14 for coating particulates with a tackifying agent to form tackified particulates and a second coating chamber 28 for coating the tackified particulates with a partitioning agent to form coated particulates.

In reference to FIG. 1, the first coating chamber 14 may have associated equipment for providing and preparing the particulates and the tackifying agent to be combined. The coating apparatus 10 may have a particulate storage vessel 12 for storing and conveying particulates to a first coating chamber 14. The first coating chamber 14 may contain a tackifying agent mixing device 16 for conveying and spreading the tackifying agent onto the surface of the particulates. The tackifying agent mixing device may be any type of mixing device capable of mixing the tackifying agent with the particulates. In an embodiment, suitable mixing devices may include, but are not limited to, screw agitators, dry blenders, paddle mixers, and ribbon blenders. In another embodiment, the entire first coating vessel may be a rotating drum mixer capable of mixing the tackifying agent and particulates. A tackifying agent metering device 18 may be used to measure the amount of the tackifying agent from a tackifying agent source 20 prior to injection into the first coating chamber 14. In an embodiment, the tackifying agent may be metered on a volumetric basis for a continuous coating operation or in a discrete amount for a batch type mixing operation.

A heating element may optionally be included in the coating apparatus to aid in the coating of the particulates. The heating element, if present, may be a particulate heater 22 located in or near the particulate storage vessel 12, a coating heater 24 located in or near the tackifying agent source 20 or tackifying agent meter 18, or a coating chamber heater 26 located in or near the first coating chamber 14. In other embodiments, two or more heaters may be provided at any of these locations based on, among other things, the particulate composition, the tackifying agent composition, whether a solvent is present in the tackifying agent, and the type of vessel and mixing device used to form the first coating chamber 14. By way of example, the tackifying agent may be introduced into the first coating chamber 14 in solid form. A coating chamber heater, a particulate heater, or both may be used to raise the temperature of the first coating chamber so as to melt the solid tackifying agent and coat the particulates. In some embodiments, a particulate heater, a tackifying agent heater, a coating chamber heater, or some combination thereof may be used to raise the temperature of the tackifying agent in the first coating to a temperature sufficient to provide a liquefied tackifying agent that may be capable of coating the particulates. In some embodiments, the temperature of the tackifying agent in the first coating vessel may be between about 100° F. and 150° F.

In still other embodiments, heated particulates may be used in the mixing device, potentially making the use of a heater unnecessary. The system of the present invention may be used at or near the manufacturing location of the particulates. Certain particulates may be manufactured using a heating process. For example, ceramic particulates may be sintered using a kiln, resulting in particulates exiting the kiln at temperatures above about 600° F. In this embodiment, the particulates may be allowed to cool to about 100° F. before being introduced into the first coating chamber along with a tackifying agent. In this embodiment, a heater may be unnecessary, and the particulate storage vessel may be used to retain the particulates until they have cooled to an appropriate temperature.

In an embodiment shown in FIG. 1, mixing of the particulates and the tackifying agent may form tackified particulates. The tackified particulates may leave the first coating chamber 14 and be conveyed to a second coating chamber 28. The second coating chamber 28 may contain a partitioning agent mixing device 30 for conveying and coating a partitioning agent onto the tackified particulates. A partitioning agent meter 32 may measure the partitioning agent provided by a partitioning agent source 34 prior to conveying the partitioning agent to the second coating chamber 28. In an embodiment, the partitioning agent may be metered on a volumetric basis for a continuous coating operation or in a discrete amount for a batch type mixing operation. The partitioning agent may be coated onto the tackified particulates to form coated particulates. The coated particulates may pass through a means to remove excess partitioning agent, such as sieve screen 36, after being conveyed out of the second coating chamber 28. As used herein, "excess" may mean any amount of partitioning agent greater than the amount required to form a layer of partitioning agent on the tackified particulates. Any excess amount may be characterized by the amount that does not remain coated on the coated particulates when contacted with a sieve screen capable of retaining the coated particulates and allowing any loose partitioning agent to pass through. Any excess partitioning agent may be recycled back to the partitioning agent meter 32 or discarded.

VI. Exemplary Methods of the Present Invention.

In some embodiments, methods of the present invention may comprise the steps of contacting particulates with a tackifying agent to create tackified particulates and then contacting the tackified particulates with a partitioning agent to create coated particulates. Generally, a source of particulates may be provided along with a source for a tackifying agent, and the particulates and tackifying agent may be brought together to create tackified particulates. The mixing may occur using a continuous or a batch process. For example, the particulates and the tackifying agent may be mixed within a first coating chamber using a suitable device continuous coating device known in the art, for example, an auger, a ribbon mixer, or a screw mixer. In other embodiments, the first coating chamber may be a batch coating device, such as a drum mixer. In embodiments wherein a drum mixer is used, the drum mixer may contain internal baffles disposed axially along the interior surface to ensure adequate movement of the particulates and the tackifying agent. Whether continuous or batch, the first coating chamber may act to spread the tackifying agent and form at least a partial layer of tackifying agent on the surface of the particulates.

After the particulates are at least partially coated with a layer of tackifying agent, forming tackified particulates, a partitioning agent may then be provided. In some embodiments, the tackified particulates may enter a second coating chamber where they may be coated with the partitioning agent to form coated particulates. To facilitate the coating process, the tackified particulates and the partitioning agent may be stirred, agitated, or otherwise mixed. Any suitable apparatus known in the art may be used as the mixing device; suitable continuous apparatuses include augers, ribbon mixers, a screw mixers while suitable batch apparatuses include drum mixers. In preferred embodiments, the process of adding a partitioning agent to the tackified particulates while mixing may continue until at least some of the surfaces of the tackified particulates are coated with partitioning agent and no longer tacky, allowing the coated particulate grains to freely detach or flow from each other in a manner similar to that of dry, uncoated particulates. The coated particulates may then be moved from the second coating chamber and pass through a means for removing any excess partitioning agent from the coated particulates, such as a sieve screen which may or may not vibrate. Any excess partitioning agent removed in the sieve screen may be recycled to the partitioning agent inlet or may be discarded. In some embodiments, the first coating chamber and the second coating chamber may coincide and exist in the same container.

In some embodiments, the coating of the particulates with tackifying agent to form tackified particulates and the coating of the tackified particulates with partitioning agent to form coated particulates may be performed as an essentially continuous process. For example, in some embodiments, coating with partitioning agent follows coating with tackifying agent by less than about 1 minute. In some embodiments, the first coating chamber feeds directly into the second coating chamber. For example, the first coating chamber may provide tackifying agent as particulates continuously flow through the first coating chamber towards the second coating chamber. In other embodiments, the first coating chamber may coat a discrete batch of particulates, ejecting the tackified particulates directly into the second coating chamber. In still other embodiments, the coating chambers may be separated by equipment which may heat, cool, vibrate, weigh, or otherwise treat or analyze the tackified particulates prior to coating with partitioning agent.

Other embodiments of the present invention provide methods of treating a subterranean formation comprising the steps of providing coated particulates made by a method comprising the steps of contacting particulates with a tackifying agent to create tackified particulates; contacting the tackified particulates with a partitioning agent to create coated particulates; slurrying the coated particulates in a treatment fluid to create a coated particulate slurry; and placing the coated particulate slurry into a subterranean formation.

Other embodiments of the present invention provide methods of providing particulates to a well during a fracturing treatment comprising the steps of providing coated particulates made by a method comprising the steps of contacting particulates with a tackifying agent to create tackified particulates; contacting the tackified particulates with a partitioning agent to create coated particulates; slurrying the coated particulates in a treatment fluid to create a coated particulate slurry; and introducing the coated particulate slurry to the well bore such that the coated particulates are disposed in a fracture in the subterranean formation.

Still other embodiments provide methods of installing a gravel pack in a well bore comprising the steps of providing coated particulates made by a method comprising the steps of contacting particulates with a tackifying agent to create tackified particulates; contacting the tackified particulates with a partitioning agent to create coated particulates; slurrying the coated particulates in a gravel packing fluid to create a coated particulate slurry; and introducing the coated particulate slurry to a well bore such that the coated particulates form a gravel pack substantially adjacent to a well bore. The coating of partitioning agent on the tackified particulate may temporarily diminish its tackiness, so that the effect of prematurely forming clusters or aggregates of particulates may be minimized.

While it may be advantageous to prepare the coated particulates remotely in time or space from the subterranean operation, the invention also contemplates preparation at the well site and/or substantially simultaneous with treatment operations. For example, a slurry of coated particulates may be prepared "on-the-fly." One such on-the-fly mixing method may involve conveying particulates and tackifying agent to a mixing vessel, for example, using a sand screw. Once inside the mixing vessel, the particulates may be contacted with a tackifying agent and a partitioning agent prior to removal from the mixing vessel. In that situation, the sand screw may be used both to aid in mixing the particulates—be they gravel, proppant, or some other particulates—with the tackifying agents and partitioning agents, and to remove the coated particulates from the mixing vessel. Batch or partial batch mixing may also be used to accomplish such coating at or near a well site just prior to introducing the particulates into a subterranean formation, in accordance with embodiments of the present invention.

To facilitate a better understanding of the present invention, the following representative examples of certain aspects of some embodiments are given. In no way should the following examples be read to limit, or define, the scope of the invention.

EXAMPLE 1

Particulates comprised of Brady sand with a weight of approximately 200 grams and a particle size of 20/40 mesh on the U.S. Sieve Series were dry coated with 3 cubic centimeters of a tackifying agent, which was a polyamide comprised predominately of a condensation reaction product of a dimer acid containing some trimer and higher oligomers and some monomer acids and a polyamine. The tackifying agent was coated onto the particulates by adding the liquid tackifying agent to the dry sand and stirring with an overhead stirrer until the sand was uniformly coated. A partitioning agent comprising 10 grams of cornstarch was then added to the tackified sand and stirred to form a dry, coated sand.

A portion of the coated sand was then stored at room temperature while another portion was stored in an oven at 100° F. The sand was stored for one week. Each sample was added to water in mixing devices. After rinsing twice with water, it was observed that each coated sand sample became tacky as the coated sand grains adhered or had affinity to the surrounding grains.

EXAMPLE 2

Particulates comprised of a ceramic particulate with a weight of approximately 200 grams and a particle size of 20/40 mesh on the U.S. Sieve Series were dry coated with 3 cubic centimeters of a tackifying agent, which was a polyamide comprised predominately of a condensation reaction product of a dimer acid containing some trimer and higher oligomers and some monomer acids and a polyamine. The tackifying agent was coated on the particulates by adding the liquid tackifying agent to the dry proppant and stirring with an overhead stirrer until the sand was uniformly coated. A partitioning agent comprising 10 grams of cornstarch was then added to the tackified proppant and stirred to form a dry, coated proppant.

A portion of the coated sand was then stored at room temperature while another portion was stored in an oven at 100° F. The sand was stored for one week. Each sample was added to water in mixing devices. After rinsing twice with water, it was observed that each coated sand sample became tacky as the coated proppant grains adhered or had affinity to the surrounding grains.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. If there is any conflict in the usage of a word or term in this specification and one or more patent or other documents that may be incorporated herein by reference, the definitions that are consistent with this specification should be adopted for the purposes of understanding this invention. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method of using particulates, the method comprising:
contacting particulates with a tackifying agent to create tackified particulates;
contacting the tackified particulates with a partitioning agent that is not hydrated and is in solid form to form coated particulates that are capable of being stored for a time period,
wherein the partitioning agent comprises a hydratable polymeric material selected from the group consisting of a corn starch, a wheat starch, a potato starch, a barley starch, a bean starch, a cassava starch, a ground rice, a ground corn, a ground wheat, a ground bean, a ground guar gum, a cellulose derivative, a polyacrylate, a polymethacrylate, a polyacrylamide, a polyvinylpyrrolidone, and a derivative thereof; and
placing the coated particulates in an aqueous treatment fluid whereby the partitioning agent hydrates, at least partially dissipates from the coated particulates, and increases the viscosity of the treatment fluid.

2. The method of claim 1 wherein the tackifying agent comprises at least one tackifying agent selected from the group consisting of: a non-aqueous tackifying agent, an aqueous tackifying agent, a silyl-modified polyamide, and a reaction product of an amine and a phosphate ester.

3. The method of claim 1 wherein the tackifying agent is coated onto the particulates in an amount from about 0.1% to about 5% by weight of the particulates.

4. The method of claim 1 wherein the partitioning agent further comprises a crosslinking agent.

5. The method of claim 1 wherein the partitioning agent substantially coats the tackified particulates; and
wherein the amount of partitioning agent coating ranges from about 0.1% to about 10% by weight of the particulates.

6. The method of claim 1, wherein the partitioning agent comprises a powder with a particle size of less than about 30 microns.

7. A method of treating a subterranean formation, the method comprising:
providing coated particulates that are capable of being stored for a time period,
wherein the coated particulates comprise particulates that are coated with a tackifying agent and a partitioning agent that is not hydrated and is in solid form coated onto the tackifying agent,
wherein the partitioning agent comprises a hydratable polymeric material selected from the group consisting of a corn starch, a wheat starch, a potato starch, a barley starch, a bean starch, a cassava starch, a ground rice, a ground corn, a ground wheat, a ground bean, a ground guar gum, a cellulose derivative, a polyacrylate, a polymethacrylate, a polyacrylamide, a polyvinylpyrrolidone, and a derivative thereof;
slurrying the coated particulates in an aqueous treatment fluid to create a coated particulate slurry and to hydrate the partitioning agent, thereby at least partially dissipating the partitioning agent from the coated particulates and increasing the viscosity of the aqueous treatment fluid; and
introducing the coated particulate slurry into a well bore disposed in a subterranean formation.

8. The method of claim 7 wherein the tackifying agent comprises at least one tackifying agent selected from the group consisting of: a non-aqueous tackifying agent, an aqueous tackifying agent, a silyl-modified polyamide, and a reaction product of an amine and a phosphate ester.

9. The method of claim 7 wherein the tackifying agent is coated onto the particulates in an amount from about 0.1% to about 5% by weight of the particulates.

10. The method of claim 7 wherein the amount of partitioning agent coating ranges from about 0.1% to about 10% by weight of the particulates.

11. The method of claim 7, wherein at least about three months elapse between coating the particulates and introducing the coated particulate slurry into the well bore.

12. The method of claim 7 wherein the partitioning agent further comprises a crosslinking agent.

13. The method of claim 7, wherein the partitioning agent comprises a powder with a particle size of less than about 30 microns.

14. A method of gravel packing, the method comprising:
providing coated particulates that are capable of being stored for a time period,
wherein the coated particulates comprise particulates coated with a tackifying agent and a partitioning agent that is not hydrated and in solid form coated onto the tackifying agent,
wherein the partitioning agent comprises a hydratable polymeric material selected from the group consisting of a corn starch, a wheat starch, a potato starch, a barley starch, a bean starch, a cassava starch, a ground rice, a ground corn, a ground wheat, a ground bean, a ground guar gum, a cellulose derivative, a polyacrylate, a polymethacrylate, a polyacrylamide, a polyvinylpyrrolidone, and a derivative thereof;
slurrying the coated particulates in an aqueous treatment fluid to create a coated particulate slurry and to hydrate the partitioning agent, thereby at least partially dissipating the partitioning agent from the coated particulates and increasing the viscosity of the aqueous treatment fluid; and
introducing the coated particulate slurry into a well bore disposed in a subterranean formation,
wherein the coated particulates form a gravel pack substantially adjacent to the well bore.

15. The method of claim 14 wherein the tackifying agent comprises at least one tackifying agent selected from the group consisting of: a non-aqueous tackifying agent, an aqueous tackifying agent, a silyl-modified polyamide, and a reaction product of an amine and a phosphate ester.

16. The method of claim 14 wherein the tackifying agent is coated onto the particulates in an amount from about 0.1% to about 5% by weight of the particulates.

17. The method of claim 14 wherein an amount of the partitioning agent coating ranges from about 0.1% to about 10% by weight of the particulates.

18. The method of claim 14 wherein the partitioning agent further comprises a crosslinking agent.

19. The method of claim 14, wherein the partitioning agent comprises a powder with a particle size of less than about 30 microns.

* * * * *